(12) United States Patent
Kuhn et al.

(10) Patent No.: US 10,686,352 B2
(45) Date of Patent: Jun. 16, 2020

(54) CONSTRUCTION ARRANGEMENT INSERTED IN BEARING FASTENING RING

(71) Applicant: WEG Equipamentos Elétricos S.A.—Motores, Jaraguá do Sul (BR)

(72) Inventors: Roger Kuhn, Jaraguá do Sul (BR); João Gustavo Togneri, Jaraguá do Sul (BR)

(73) Assignee: WEG EQUIPAMENTOS ELÉTRICOS S.A.—MOTORES, Jaraguá do Sul (BR)

( * ) Notice: Subject to any disclaimer, the term of this patent is extended or adjusted under 35 U.S.C. 154(b) by 390 days.

(21) Appl. No.: 15/564,533

(22) PCT Filed: Apr. 24, 2015

(86) PCT No.: PCT/BR2015/050048
§ 371 (c)(1),
(2) Date: Oct. 5, 2017

(87) PCT Pub. No.: WO2016/168906
PCT Pub. Date: Oct. 27, 2016

(65) Prior Publication Data
US 2018/0076699 A1    Mar. 15, 2018

(51) Int. Cl.
*H02K 15/16* (2006.01)
*H02K 5/16* (2006.01)
*H02K 5/167* (2006.01)

(52) U.S. Cl.
CPC .............. *H02K 15/16* (2013.01); *H02K 5/16* (2013.01); *H02K 5/1672* (2013.01)

(58) Field of Classification Search
CPC .......... H02K 5/167; H02K 15/16; H02K 5/16; H02K 5/1672
See application file for complete search history.

(56) References Cited

U.S. PATENT DOCUMENTS

| 5,448,119 A | 9/1995 | Kono et al. |
| 2003/0048964 A1 | 3/2003 | Brackett et al. |
| 2012/0106883 A1* | 5/2012 | Griffin .................... F16C 23/10 384/441 |
| 2017/0353087 A1* | 12/2017 | Magno Dos Santos ..................... H01R 39/12 |

FOREIGN PATENT DOCUMENTS

GB        407855 A      3/1934

OTHER PUBLICATIONS

International Search Report and Written Opinion for Related International Application No. PCT/BR2015/050048, dated Jul. 15, 2015, 7 pages, (translation of ISR Only—2 pages).

* cited by examiner

*Primary Examiner* — Emily P Pham
(74) *Attorney, Agent, or Firm* — Troutman Sanders LLP; Ryan Schneider; Christopher Close

(57) ABSTRACT

A bearing fastening ring used in rotating electrical machines that is able to receive bearings of several diameters when the ring is positioned over a shaft. The bearing fastening ring includes a semi-circular element, scaling profiles of different diameters to accommodate different sizes of bearing, grounding ring apertures in the semi-circular element, cover assemblies extending out from the outer diameter of the semi-circular element, and bracket assemblies extending out from the outer diameter of the semi-circular element.

8 Claims, 5 Drawing Sheets

CONSTRUCTION ARRANGEMENT INSERTED IN BEARING FASTENING RING

CROSS-REFERENCE TO RELATED APPLICATIONS

This application is a US National Stage of International Application No. PCT/BR2015/050048 filed 24 Apr. 2015 herein fully incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a bearing fastening ring used in rotating electrical machines. The bearing fastening ring able to receive bearings of several diameters when positioned over a shaft.

2. Description of Related Art

The bearing fastening ring is used where no axial displacement of the shaft is allowed, and the size of the bearing fastening ring depends on the size of the bearing used in the rotating electrical machine.

For rotating electrical machines having interchangeability among bearing diameters, when replacement of one bearing for another one of a different size is required, replacement of the bearing fastening ring is mandatorily required according to the new bearing size. Once the rotor of the electrical machine is manufactured, in order to allow fastening of the ring inside the factory, correct positioning of the screwed slots of the ring with the corresponding cover or flange slots is required where the ring is to be installed, so that the screws of the bearing fastening ring are properly aligned and coinciding, thus expediting the assembly process. In the field, though, the work is considerably more difficult, as the rotating electrical machine must be disassembled and the bearing of the shaft to be locked must be removed; the ring is then positioned over the shaft and the bearing is pressed, so that the bearing fastening ring may be assembled, which often leads to replacement of the damaged bearing after the removal phase. In some embodiments, shaft grounding is also required, which may be directly fastened by at least two fastening elements, or using brackets.

The state of the art includes two documents that feature bearing fastening devices.

Utility model CN203243162 provides a proposal within this scope, which comprises a bearing fastening device including 2 rings that may be lubricated, distinguishing from the model featured herein as it has no scaling for different bearing sizes.

Document U.S. Pat. No. 4,170,058 shows an alternative for lubricating the bearing, distinguishing from the model featured herein that serves for locking the grounding ring fastening shaft.

Documents CN203243162, DE102008042759, and CN201312190 feature devices with similar objectives to the model proposed herein, but different from this model, particularly due to the lack of scaling for three bearing sizes, a feature that is not included in any of the documents described and known models.

In face of the aforementioned, the lack of feasible solutions for fastening the bearing and preventing axial displacement of the shaft was evidenced, without removing the bearing to be locked or any need to change the component when different bearing sizes are featured, and enabling grounding fastening.

BRIEF SUMMARY OF THE INVENTION

This present invention aims at circumventing the disadvantages of the state of the art, having as its main objective to allow fastening of several bearing sizes using the same bearing fastening ring, i.e., not requiring replacement of the component.

Another objective is to provide means to allow fastening of a grounding system with conductive bristles in the bearing fastening ring.

Another objective of the present invention is the possibility to disassemble the ring without removing the bearing from the rotating electrical machine.

In an exemplary embodiment of the present invention, a bearing fastening ring comprises a semi-circular element having an outer diameter, an inner diameter and a bearing face for receiving a bearing, the semi-circular element defining a central shaft axis, and having a horizontal centerline and a vertical centerline both bisecting the central shaft axis and normal to one another, scaling profiles of different diameters in the bearing face, the scaling profiles of different diameters being of diameters less than the outer diameter of the semi-circular element and greater than the inner diameter of the semi-circular element, grounding ring apertures in the semi-circular element, cover assemblies extending out from the outer diameter of the semi-circular element, and bracket assemblies extending out from the outer diameter of the semi-circular element.

The two grounding ring apertures preferably lie on the horizontal centerline of the semi-circular element, one each on a left side and a right side of the semi-circular element.

The two cover assemblies preferably lie on the horizontal centerline of the semi-circular element, one each on a left side and a right side of the semi-circular element.

The bearing fastening ring can comprise three scaling profiles to accommodate three different sizes of bearing.

In an another exemplary embodiment of the present invention, a bearing fastening ring comprises a metallic, curved, semi-circular bracket having an outer diameter, an inner diameter and a bearing face for receiving a bearing, the semi-circular element defining a central shaft axis, and having a horizontal centerline and a vertical centerline both bisecting the central shaft axis and normal to one another, scaling profiles of different diameters in the bearing face, the scaling profiles of different diameters being of diameters less than the outer diameter of the semi-circular element and greater than the inner diameter of the semi-circular element, grounding ring apertures in the semi-circular element, cover assemblies extending out from the outer diameter of the semi-circular element, and bracket assemblies extending out from the outer diameter of the semi-circular element, wherein two grounding ring apertures lie on the horizontal centerline of the semi-circular element, one each on a left side and a right side of the semi-circular element, wherein two cover assemblies lie on the horizontal centerline of the semi-circular element, one each on the left side and the right side of the semi-circular element, each cover assembly comprising a through hole, and wherein four bracket assemblies lie vertically and horizontally symmetrically about the semi-circular element, two each on the left side and right side of the semi-circular element.

The two left side bracket assemblies can be positioned, one rotationally above and one rotationally below, the left side cover assembly. The two right side bracket assemblies can be positioned, one rotationally above and one rotationally below, the right side cover assembly.

In another exemplary embodiment of the present invention, a bearing construction assembly comprises the prior described bearing fastening ring, a bearing cooperatively sized to one of the scaling profiles in the bearing face of the bearing fastening ring, a cover releasably secured to the bearing fasting ring via cover fastening elements and the cover assemblies of the semi-circular element, and a grounding ring releasably secured to the bearing fasting ring via grounding ring fastening elements and the grounding ring apertures in the semi-circular element.

The two grounding ring apertures preferably lie on the horizontal centerline of the semi-circular element, one each on a left side and a right side of the semi-circular element. The two cover assemblies preferably lie on the horizontal centerline of the semi-circular element, one each on the left side and the right side of the semi-circular element, each cover assembly comprising a through hole. The four bracket assemblies preferably lie vertically and horizontally symmetrically about the semi-circular element, two each on the left side and right side of the semi-circular element.

DETAILED DESCRIPTION OF THE INVENTION

Figure 1:
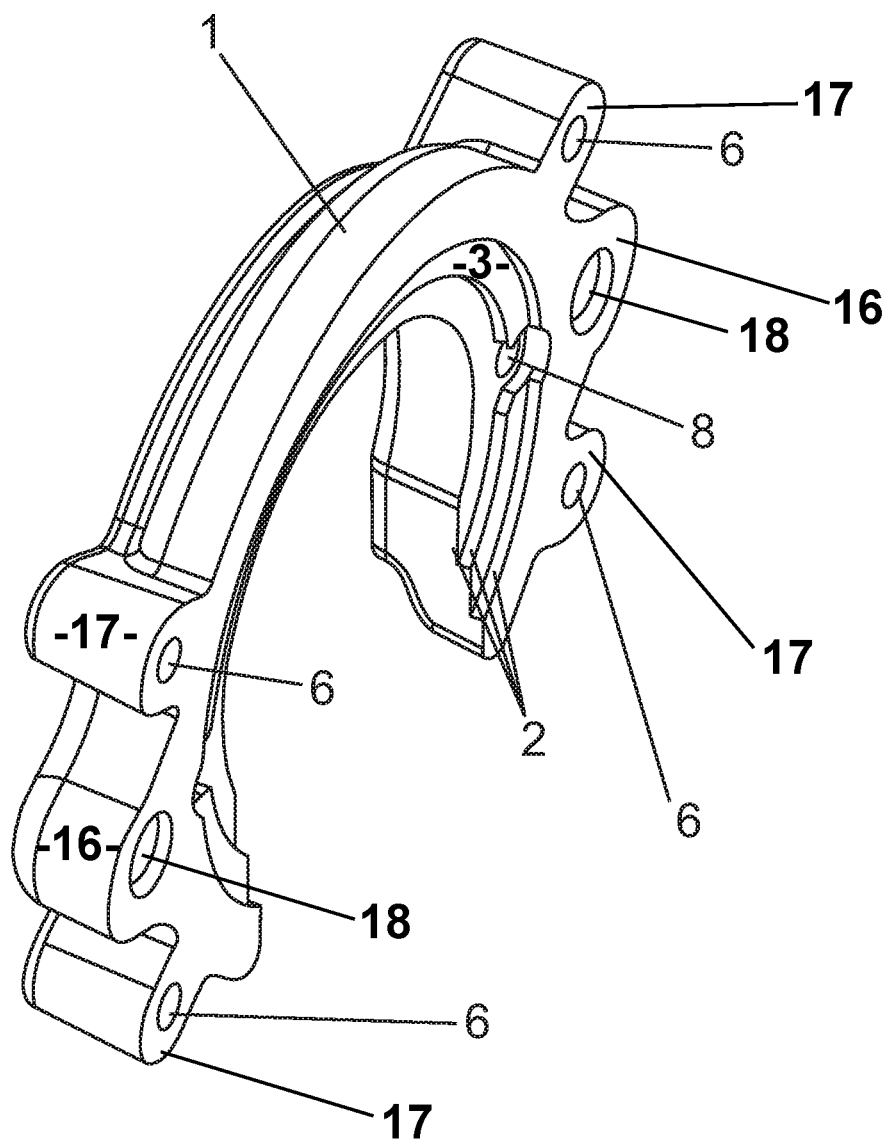
FIG. 1 shows a perspective view of the bearing fastening ring.

The present bearing fastening ring 1 can be a semi-circular element having an outer diameter, an inner diameter and a bearing face 3 for receiving a bearing 10, the semi-circular element defining a central shaft axis 14, through which a horizontal centerline 8e and a vertical centerline 15 both bisect the central shaft axis 14 and are normal to one another.

Scaling profiles 2 of different diameters are formed in the bearing face 3, the scaling profiles of different diameters being of diameters less than the outer diameter of the semi-circular element and greater than the inner diameter of the semi-circular element.

Grounding ring apertures 8 are located in the semi-circular element. Cover assemblies 16 extend out from the outer diameter of the semi-circular element. Bracket assemblies 17 extend out from the outer diameter of the semi-circular element.

The present invention features the bearing fastening fastening ring 1 used in rotating electrical machines, manufactured in aluminum, steel or cast iron in a semi-circular shape. The ring 1 is positioned over a shaft 11, not requiring any additional tools for insertion or removal of the bearing 10 during the assembly, installation or maintenance phases of the rotating electrical machine.

Figure 2:
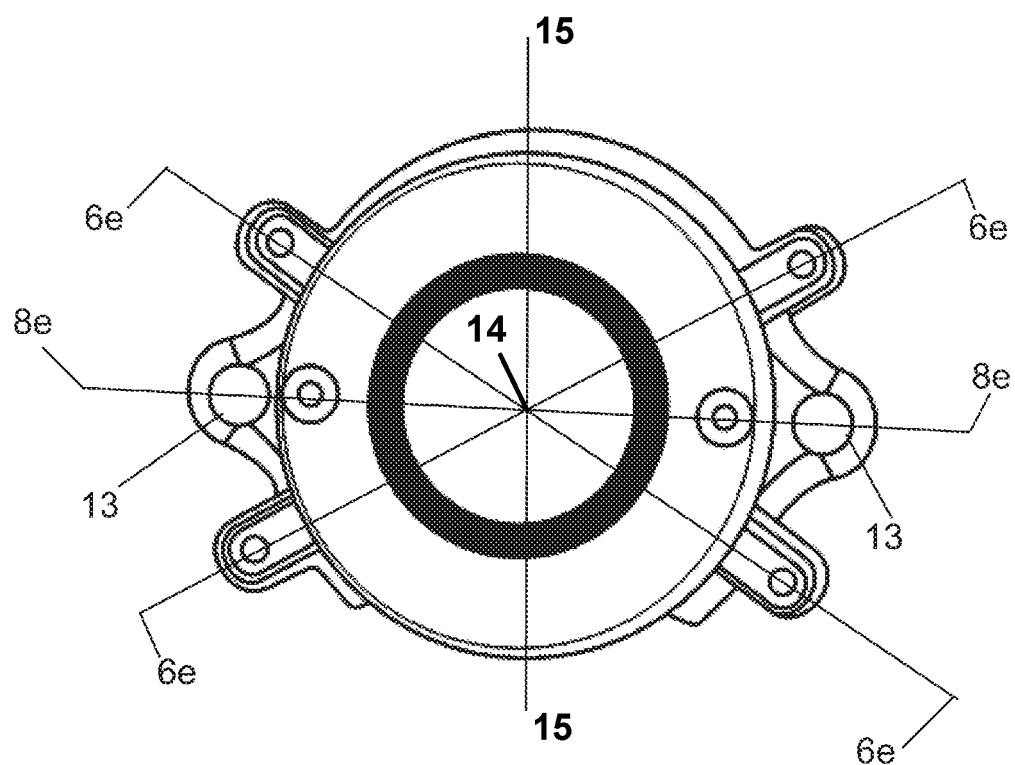
FIG. 2 shows a front view of the bearing fastening ring, demonstrating the centerlines.
Figure 8:
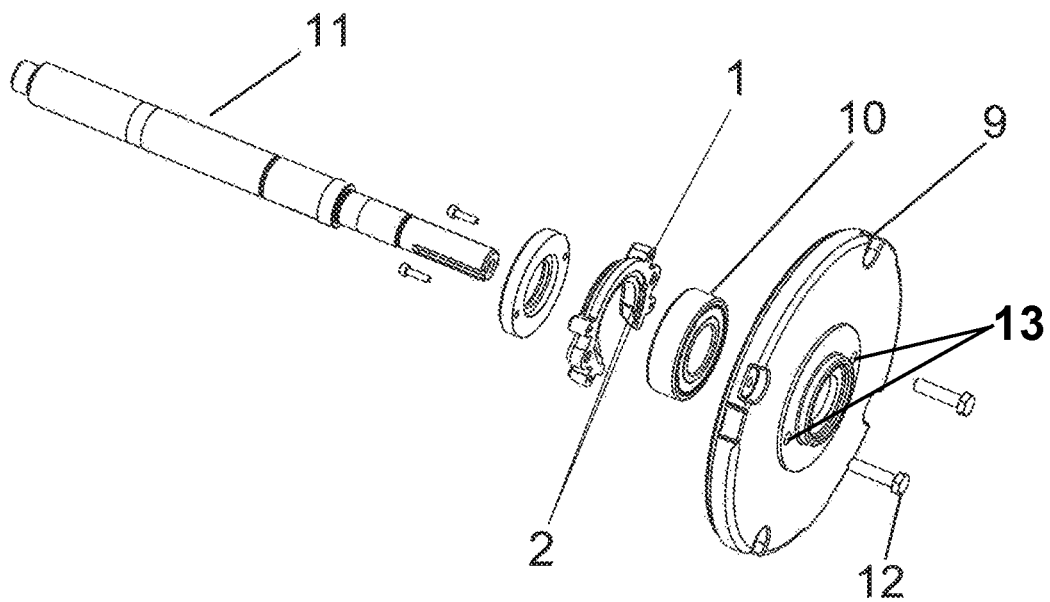
FIG. 8 shows an exploded view of the assembly of the bearing fastening ring with a shaft, cover, bearing and the shaft grounding.

The ring 1 has cover assemblies 16 with holes 18 as shown in FIG. 1, and the ring 1 is fastened to a cover 9 by means of two symmetrical and parallel central holes 13 as shown in FIGS. 2, 8, that are designed to align with holes 18, one hole 13 in each external end of the center horizontal line 8e, wherein at least two fastening elements 12 traverse the holes 13, 18 and remain in contact with the side of the external bearing ring 10 to be locked, according to the bearing size, with the contact taking place on one of the scaling profiles 2 designed for this purpose.

Figure 5:
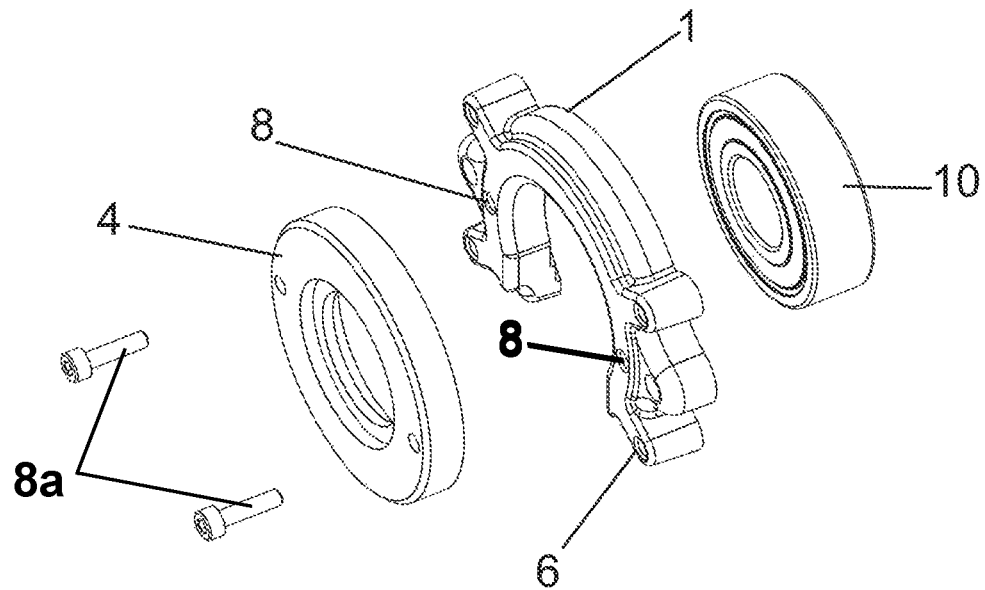
FIG. 5 shows an exploded view of the assembly of the bearing fastening ring with shaft grounding.
Figure 6:
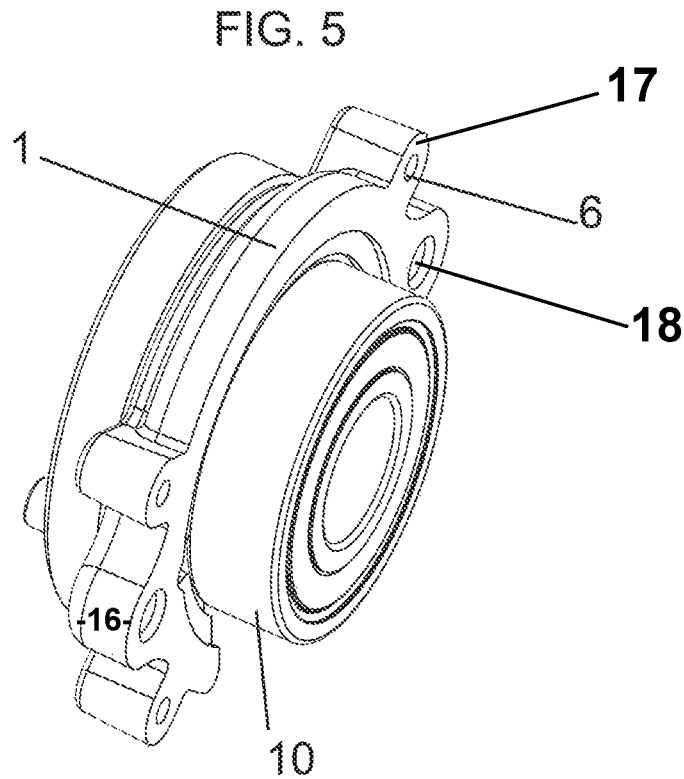
FIG. 6 shows a perspective view of the bearing fastening ring assembled with shaft grounding, illustrating the scaled region for placement of the bearing.
Figure 7:
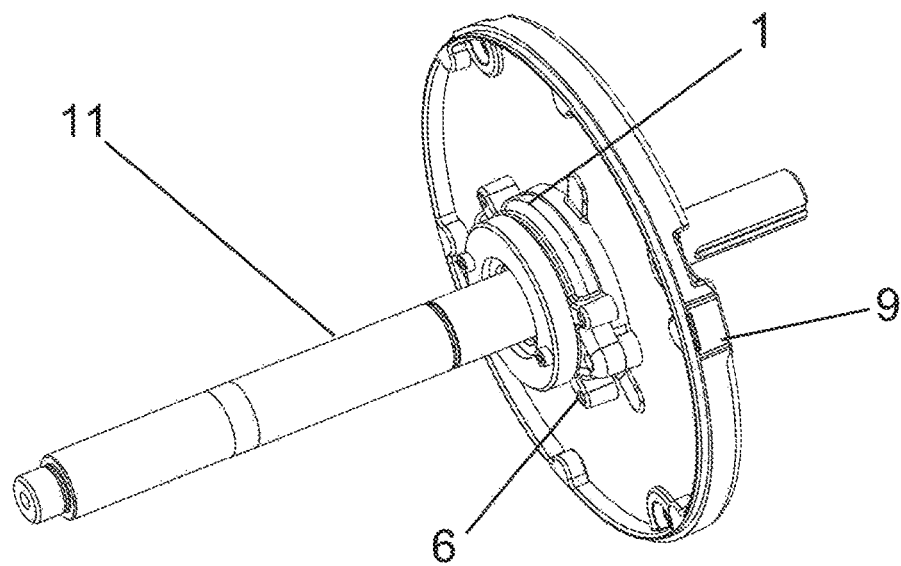
FIG. 7 shows a perspective view of the assembly of the bearing fastening ring with a shaft, cover, bearing and the shaft grounding.

Each scaling profiles 2 is designed for a different bearing size, preventing assembly issues or lack of contact area to support the side of the external bearing ring 10. There are at least two symmetrical and parallel grounding ring apertures 8 (FIGS. 3, 5) for fastening the shaft grounding, located at the ends of the center horizontal line 8e of the bearing fastening ring 1, enabling direct fastening of a grounding ring 4 onto the bearing fastening ring 1 by using at least two fastening elements 8a, e.g., screws.

Figure 3:
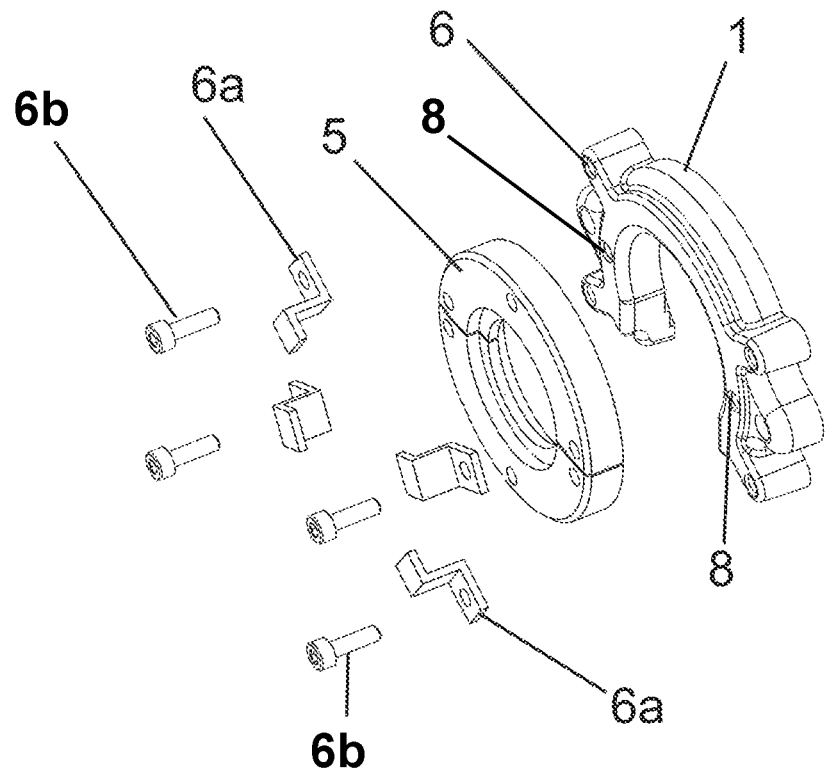
FIG. 3 shows an exploded view of the assembly of the bearing fastening ring with a two-tier grounding.
Figure 4:
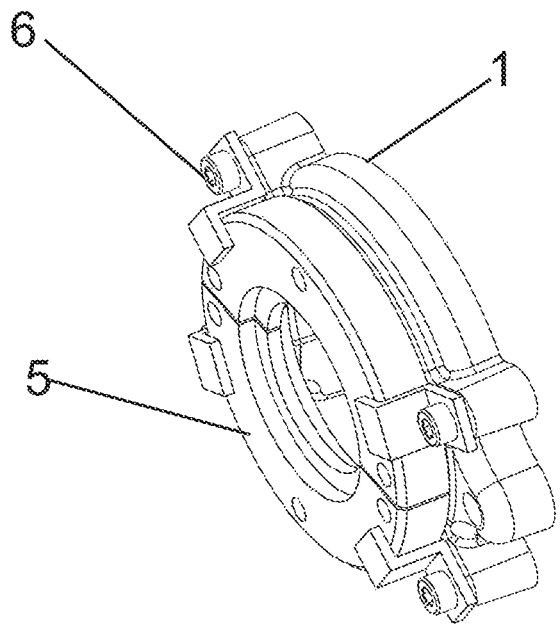
FIG. 4 shows a perspective view of the assembly of the bearing fastening ring with a two-tier grounding.

Another alternative for applying the present invention is shown in FIG. 3 by added means of four symmetrical bracket assemblies 17 (having holes 6) located at the ends of its diagonally traced center line 6e, which enable fastening a two-tier grounding ring 5 to the bearing fastening ring 1 through clamps 6a fastened to the bracket assemblies 17 or by fastening elements 6b, e.g., screws through holes 6.

The invention claimed is:

1. A bearing fastening ring comprising:
a semi-circular element having an outer diameter, an inner diameter and a bearing face for receiving a bearing, the semi-circular element defining a central shaft axis, and having a horizontal centerline and a vertical centerline both bisecting the central shaft axis and normal to one another;
scaling profiles of different diameters in the bearing face, the scaling profiles of different diameters being of diameters less than the outer diameter of the semi-circular element and greater than the inner diameter of the semi-circular element;
grounding ring apertures in the semi-circular element;
cover assemblies extending out from the outer diameter of the semi-circular element; and
bracket assemblies extending out from the outer diameter of the semi-circular element.

2. The bearing fastening ring of claim 1, wherein two grounding ring apertures lie on the horizontal centerline of the semi-circular element, one each on a left side and a right side of the semi-circular element.

3. The bearing fastening ring of claim 1, wherein two cover assemblies lie on the horizontal centerline of the semi-circular element, one each on a left side and a right side of the semi-circular element.

4. The bearing fastening ring of claim 1 comprising three scaling profiles to accommodate three different sizes of bearing.

5. A bearing construction assembly comprising:
the bearing fastening ring of claim 1;
a bearing cooperatively sized to one of the scaling profiles in the bearing face of the bearing fastening ring;
a cover releasably secured to the bearing fasting ring via cover fastening elements and the cover assemblies of the semi-circular element; and
a grounding ring releasably secured to the bearing fasting ring via grounding ring fastening elements and the grounding ring apertures in the semi-circular element.

6. The bearing construction assembly of claim 5, wherein:
two grounding ring apertures lie on the horizontal centerline of the semi-circular element, one each on a left side and a right side of the semi-circular element;
two cover assemblies lie on the horizontal centerline of the semi-circular element, one each on the left side and the right side of the semi-circular element, each cover assembly comprising a through hole; and
four bracket assemblies lie vertically and horizontally symmetrically about the semi-circular element, two each on the left side and right side of the semi-circular element.

7. A bearing fastening ring comprising:
a metallic, curved, semi-circular bracket having an outer diameter, an inner diameter and a bearing face for receiving a bearing, the semi-circular element defining a central shaft axis, and having a horizontal centerline and a vertical centerline both bisecting the central shaft axis and normal to one another;
scaling profiles of different diameters in the bearing face, the scaling profiles of different diameters being of diameters less than the outer diameter of the semi-circular element and greater than the inner diameter of the semi-circular element;
grounding ring apertures in the semi-circular element;
cover assemblies extending out from the outer diameter of the semi-circular element; and
bracket assemblies extending out from the outer diameter of the semi-circular element;
wherein two grounding ring apertures lie on the horizontal centerline of the semi-circular element, one each on a left side and a right side of the semi-circular element;
wherein two cover assemblies lie on the horizontal centerline of the semi-circular element, one each on the left side and the right side of the semi-circular element, each cover assembly comprising a through hole; and
wherein four bracket assemblies lie vertically and horizontally symmetrically about the semi-circular element, two each on the left side and right side of the semi-circular element.

8. The bearing fastening ring of claim 7, wherein the two left side bracket assemblies are positioned, one rotationally above and one rotationally below, the left side cover assembly; and
wherein the two right side bracket assemblies are positioned, one rotationally above and one rotationally below, the right side cover assembly.

* * * * *